Sept. 3, 1929.   B. A. LUNDY   1,726,992
TRUNKING SUPPORT
Filed May 31, 1928
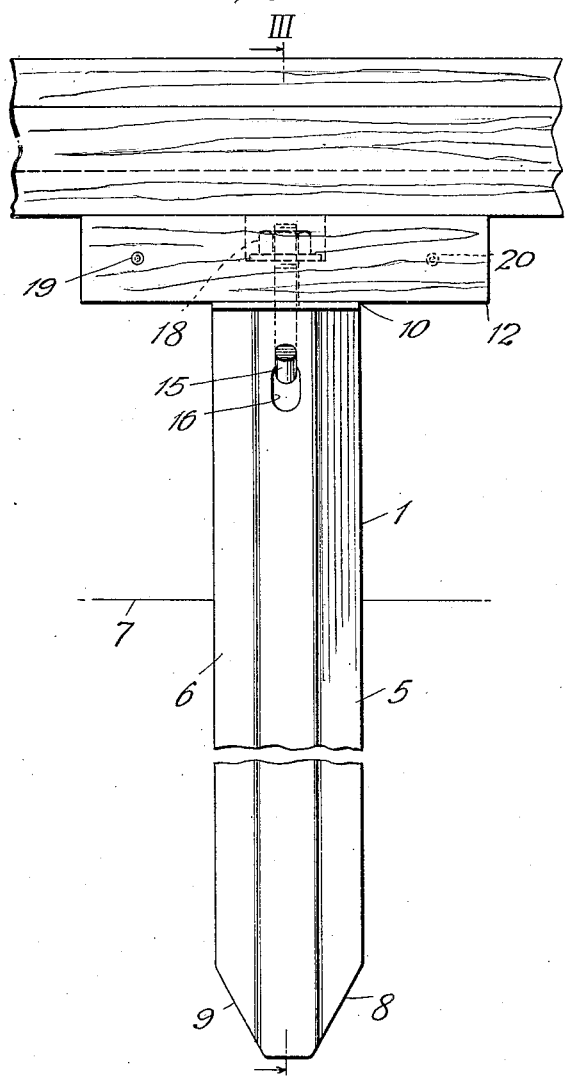
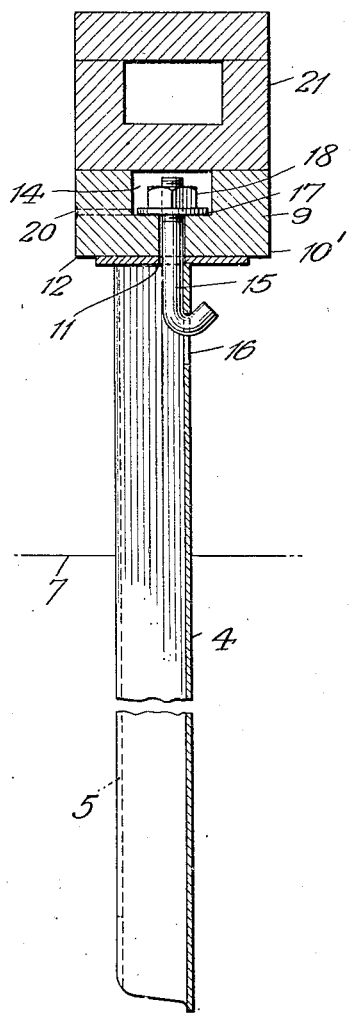
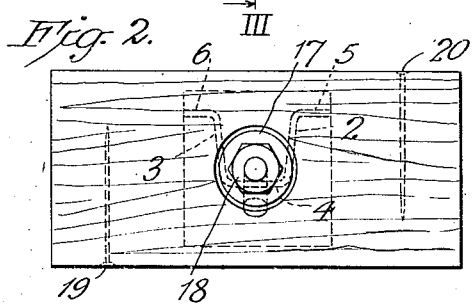
INVENTOR.
BEVERLY A. LUNDY.
BY Lyman E. Dodge
ATTORNEY.

Patented Sept. 3, 1929.

1,726,992

UNITED STATES PATENT OFFICE.

BEVERLY A. LUNDY, OF LARCHMONT, NEW YORK.

TRUNKING SUPPORT.

Application filed May 31, 1923. Serial No. 281,815.

This invention relates to a support and particularly a support for trackway structures and more especially that trackway structure known as a trunking.

The principal object of this invention is the provision of a device of the kind specified which will be inexpensive to manufacture, constructed of readily obtainable materials, easy to assemble, reasonably durable in use and particularly efficient for its purpose.

Other objects and advantages will appear as the description of the particular physical embodiment selected to illustrate the invention progresses, and the novel features of the invention will be particularly pointed out in the appended claims.

In describing the invention in detail, and the particular physical embodiment selected to illustrate the invention, reference is had to the accompanying drawing, wherein has been illustrated a particular preferred physical embodiment of the invention, and wherein like characters of reference designating corresponding parts throughout the several views, and in which:

Figure 1, is a side elevational view illustrating my new device in use for supporting trunking; Fig. 2, is a top plan view of the device as illustrated by Fig. 1; Fig. 3, is a cross sectional view on the plane indicated by the line III—III of Fig. 1 viewed in the direction of the arrows at the ends of the lines.

In the drawings, 1 designates a member preferably of metal which has the form, in part, of a channel, the side walls, as shown in Fig. 2, being designated 2 and 3, and the bottom wall being designated 4. In addition to the channel shape, the member 1 also includes and exhibits flanges as 5 and 6, best shown in Fig. 2. The whole member 1 will be called a flanged channel shaped member. This flanged channel shaped member, is the preferred form of this particular part of the invention, although it is not intended to exclude other well known and appropriately shaped members suitable for the purpose for which member 1 is used.

The flanged channel shaped member 1 in use is driven or otherwise suitably inserted into the ground. A ground line being indicated at 7 in Figs. 1 and 3. To facilitate driving member 1, the lower end is tapered as shown at 8 and 9.

On the top of member 1, a plate 10 is positioned. This plate 10 is made of fairly highly resistance material preferably metal and is extensive enough to afford an ample bearing for a member resting thereon. The plate 10 is formed with an orifice at 11 for the reception of the body of a hook bolt to be hereinafter more fully described.

Upon the plate 10 is positioned a block 12. This block 12 is orificed at 13 and has a cavity formed therein at 14. The orifice 13 connects with the cavity 14 and the orifice 13 is adapted for the reception of the body of a hook bolt to be hereinafter described. The block 12 is formed of a fairly readily penetrable material, that is, a material into which nails may be driven or what are known as wood screws readily inserted and is preferably made of wood.

In order to unite the block 12, the plate 10 and the flanged channel shaped member 1, a hook bolt 15 is employed. This hook bolt 15 passes through an orifice 16 in the bottom wall 4 of the flanged channel shaped member 1 and engages with that bottom wall, as best shown in Fig. 3. The body of the hook bolt 15, passes through the orifice 11 in the plate 10, and the orifice 13 in the block 12. The upper end of the hook bolt 15 is threaded and a nut is screwed thereon. A washer 17 is, in accordance with the well known practice, positioned between the nut 18 and the block 10. By screwing the nut onto the hook bolt 15, all of the parts are brought firmly together, so that they become practically as rigid as a one piece structure.

As the block 10 is preferably made of wood, nails 19 and 20 are driven therein from opposite sides, as best shown in Figure 2, in order to prevent the block 2 from splitting.

When the member 1 is inserted in the ground, the ground line being indicated at 7 in Fig. 1, and the plate 10 and the block 12 placed thereon and secured in position by the hook bolt 15, then the device is in position and in condition to act as a support. In the drawings, the device is indicated as supporting a trunking 21 which is illustrated as an ordinary and well known wire trunking used in railway signalling. This trunking may be attached to the block 10 by any of the well known methods as the block 10 is made of fairly readily penetrable material so that ordinary nails or wood screws may be used.

Although I have particularly described the construction of one physical embodiment of my invention, and explained the operation and principal thereof, nevertheless, I desire to have it understood that the forms selected is merely illustrative but does not exhaust the possible physical embodiment of the idea of means underlying my invention.

What I claim as new and desire to secure by Letters Patent of the United States, is:

1. In a trunking support, in combination: a flanged channel shaped member formed with an orifice in the bottom wall of the channel; a flat plate formed with an orifice positioned on one end of the said member; a block of fairly readily penetrable material formed with a cavity and a connecting orifice and a hook bolt having the hook of the bolt passing through the orifice in the channel and engaging the bottom wall thereof and having the body of the bolt passing through the orifice in the said plate and in the said block and a nut engaging the hook bolt within the said cavity.

2. In a trunking support, in combination: a block of fairly readily penetrable material formed with a cavity and an orifice opening into the cavity; a metal plate formed with an orifice beneath the block and positioned thereagainst; a hook bolt passing through the said orifices and having a nut thereon resting in the said cavity and a member abutting the said plate and formed with an orifice for the reception of the hook of the bolt.

BEVERLY A. LUNDY.